(12) United States Patent
Takai et al.

(10) Patent No.: US 7,539,401 B2
(45) Date of Patent: May 26, 2009

(54) HEATING UNIT AND RESIN SHEET HEATING APPARATUS

(75) Inventors: Toshihiro Takai, Aichi-gun (JP); Yasuyoshi Ohashi, Aichi-gun (JP); Kazushi Hayashi, Aichi-gun (JP)

(73) Assignee: Asano Laboratories Co., Ltd., Aichi-ken (JP)

( * ) Notice: Subject to any disclaimer, the term of this patent is extended or adjusted under 35 U.S.C. 154(b) by 251 days.

(21) Appl. No.: 11/558,513

(22) Filed: Nov. 10, 2006

(65) Prior Publication Data

US 2008/0124061 A1 May 29, 2008

(30) Foreign Application Priority Data

Aug. 29, 2006 (JP) ............................. P2006-232255

(51) Int. Cl.
*A45D 20/40* (2006.01)
(52) U.S. Cl. ..................... 392/407; 392/467; 219/532
(58) Field of Classification Search .................. 392/407
See application file for complete search history.

(56) References Cited

U.S. PATENT DOCUMENTS

| 3,943,333 | A | * | 3/1976 | Kokjohn et al. ............. 219/532 |
| 4,468,557 | A | * | 8/1984 | Bylin et al. ................. 219/535 |
| 4,626,667 | A | * | 12/1986 | Asano ....................... 219/542 |
| 4,651,124 | A | * | 3/1987 | Kirilloff et al. ............. 338/280 |
| 5,159,176 | A | * | 10/1992 | Sherrer ...................... 219/213 |
| 6,725,598 | B2 | * | 4/2004 | Yoneda et al. ................. 47/60 |
| 7,323,664 | B1 | * | 1/2008 | Takai et al. ................. 219/488 |
| 2003/0005626 | A1 | * | 1/2003 | Yoneda et al. ................. 47/69 |
| 2008/0083733 | A1 | * | 4/2008 | Takai et al. ............. 219/448.17 |

FOREIGN PATENT DOCUMENTS

| JP | 2002-043024 | 2/2002 |
| JP | 2003-181912 | 7/2003 |

\* cited by examiner

*Primary Examiner*—Thor S Campbell
(74) *Attorney, Agent, or Firm*—Wood, Herron & Evans, LLP (57) ABSTRACT

A heating unit includes a plurality of radiant heaters, a plurality of brackets on which the radiant heaters are mounted in a row, and a frame on which the brackets are mounted in a parallel arrangement and thereby the radiant heaters are mounted in a grid configuration, wherein each of the radiant heaters includes: a support plate substantially having a rectangular shape; a pair of connection terminals substantially perpendicularly extending, while having a space therebetween, from one surface of the support plate; and a strip-shaped heater element arranged between the pair of connection terminals and covering the one surface of the support plate, and wherein the connection terminals have connection portions projecting from the other surface of the support plated, and each of the brackets has a terminal hole into which the connection portion is inserted.

4 Claims, 7 Drawing Sheets

HEATING UNIT AND RESIN SHEET HEATING APPARATUS

BACKGROUND OF THE INVENTION

1. Field of the Invention

The present invention relates to a heating unit constituted by arranging radiant heaters, and relates to a resin sheet heating apparatus using the heating unit.

Priority is claimed on Japanese Patent Application No. 2006-232255, filed Aug. 29, 2006, the content of which is incorporated herein by reference.

2. Description of Related Art

Conventionally, as the type of heating unit described above, a heating unit has been proposed, as disclosed, for example, in Japanese Patent No. 3576080 and Japanese Unexamined Patent Application, First Publication No. 2003-181912, in which radiant heaters are arranged in a grid configuration on a frame, each radian heater including a support plate having a substantially square plate shape and a strip-shaped heater element provided on the support plate.

In this heater unit, the strip-shaped beater element is directly heated by supplying electrical power to the strip-shaped heater element, and a heated object is heated using radiant heat from the strip-shaped heater element, and thus a resin sheet, for example, can be evenly heated by the radiant heaters that are arranged in a grid configuration.

In such a heating unit, the temperature of the strip-shaped heater element can be adjusted by changing electrical current or voltage being supplied to the strip-shaped heater element, and the state of heating of the heated object due to the radiant heater can be controlled in a preferable responsive manner.

Incidentally, in the conventional heating unit, because the radiant heaters are individually mounted one after another on the frame of the heater unit, the mounting work and connecting work for wirings to be connected to the radiant heaters are complicated and require long time and much workload.

Moreover, when the radiant heater thermally deforms during a heating operation, the support plates of the radiant heaters adjacent to each other may interfere each other, and the heated object may not be evenly heated. To prevent this problem, it is necessary to adjust the gap between the radiant heaters; however, it is a further complicated difficult work to mount many radiant heaters on the frame while taking the gap between the radiant heaters into account.

SUMMARY OF THE INVENTION

The present invention was made in view of the aforementioned circumstances, and an object thereof is to provide a heating unit in which it is easy to mount radiant heaters on a frame and to connect wirings and that realizes a stable heating by preventing interference between the radiant heaters due to thermal deformation of the radiant heaters, and to provide a resin sheet heating apparatus in which the heating unit is employed.

The order to achieve the above object, the present invention provides a heating unit including: a plurality of radiant heaters; a plurality of brackets on which the radiant heaters are mounted in a row; and a frame on which the brackets are mounted in a parallel arrangement and thereby the radiant heaters are mounted in a grid configuration, wherein each of the radiant heaters includes: a support plate substantially having a rectangular shape; a pair of connection terminals substantially perpendicularly extending, while having a space therebetween, from one surface of the support plate; and a strip-shaped heater element arranged between the pair of connection terminals and covering the one surface of the support plate, and wherein the connection terminals have connection portions projecting from the other surface of the support plated, and each of the brackets has a terminal hole into which the connection portion is inserted.

Moreover, the present invention provides a resin sheet heating apparatus including at least two of the aforementioned heating units, wherein the heating units are arranged so that radiant heaters thereof face each other, and the resin sheet heating apparatus is configured in such a manner that a resin sheet that is a heated object is disposed between the heating units.

According to the heating unit and the resin sheet heating apparatus of the present invention, because the radiant heaters are mounted on the bracket in a row, and the brackets are mounted on the frame in a parallel arrangement, the heating unit can be constituted by mounting the radiant heaters on the bracket, and thereafter by mounting the brackets on the frame, and thus it is easy to carry out the mounting work for the radiant heaters.

Moreover, because the terminal holes, into which the connection portions of the connection terminals are inserted, are formed in the bracket, the connection portions projecting from the terminal holes are aligned in a row, and thereby it is easy to carry out the wiring work.

Moreover, by adjusting the distance between the radiant heaters in the row when the radiant heaters are mounted on the bracket, and by adjusting the distance between the brackets when the brackets are mounted on the frame in a parallel arrangement, interference between the radiant heaters can be prevented when the radiant heaters thermally deform, the heated object can be stably heated. In addition, because the adjustment of the distance in each step is in only one direction, it is easy to adjust the positions of the radiant heaters.

By forming recesses at least at portions of the brackets fixed to the frame in a parallel arrangement, the recesses in the adjacent brackets opening toward each other, and by disposing a protective pipe in an insertion hole that is defined by disposing the recesses so as to oppose each other, measured results by the sensor can be fed back so that electrical current or voltage being supplied to the strip-shaped heater element can be adjusted, and thus the state of heating can be precisely controlled.

Moreover, by forming a fixing hole for fixing the bracket to the frame, and by making the fixing hole to be an oblong hole whose longer diameter extends in a direction along which the radiant heaters are arranged in a row, the bracket can be reliably fixed to the frame even when the bracket thermally expands due to temperature rise, and the heated object can be stably heated.

Furthermore, by arranging ones of the pair of connection terminals of the radiant heaters in a row and by connecting to each other by a bus bar, it is not necessary to connect a power cable or the like to one of the connection terminals.

As described above, according to the present invention, a heating unit is provided in which it is easy to mount radiant heaters on a frame and to connect wirings and that realizes a stable heating by preventing interference between the radiant heaters due to thermal deformation of the radiant heaters, and to provide a resin sheet heating apparatus in which the heating unit is employed.

DETAILED DESCRIPTION OF THE INVENTION

An embodiment of the present invention will be explained below with reference to the drawings. FIGS. 1 to 4 show a heating unit as an embodiment. Moreover, FIGS. 5 to 7 show a radiant heater employed in the heating unit.

A heating unit 10 includes radiant heaters 20 having a substantially square plate shape, brackets 50 on which the radiant heaters 20 are mounted in a row, and a frame 11 on which the brackets 50 are mounted in a parallel arrangement.

Figure 5:
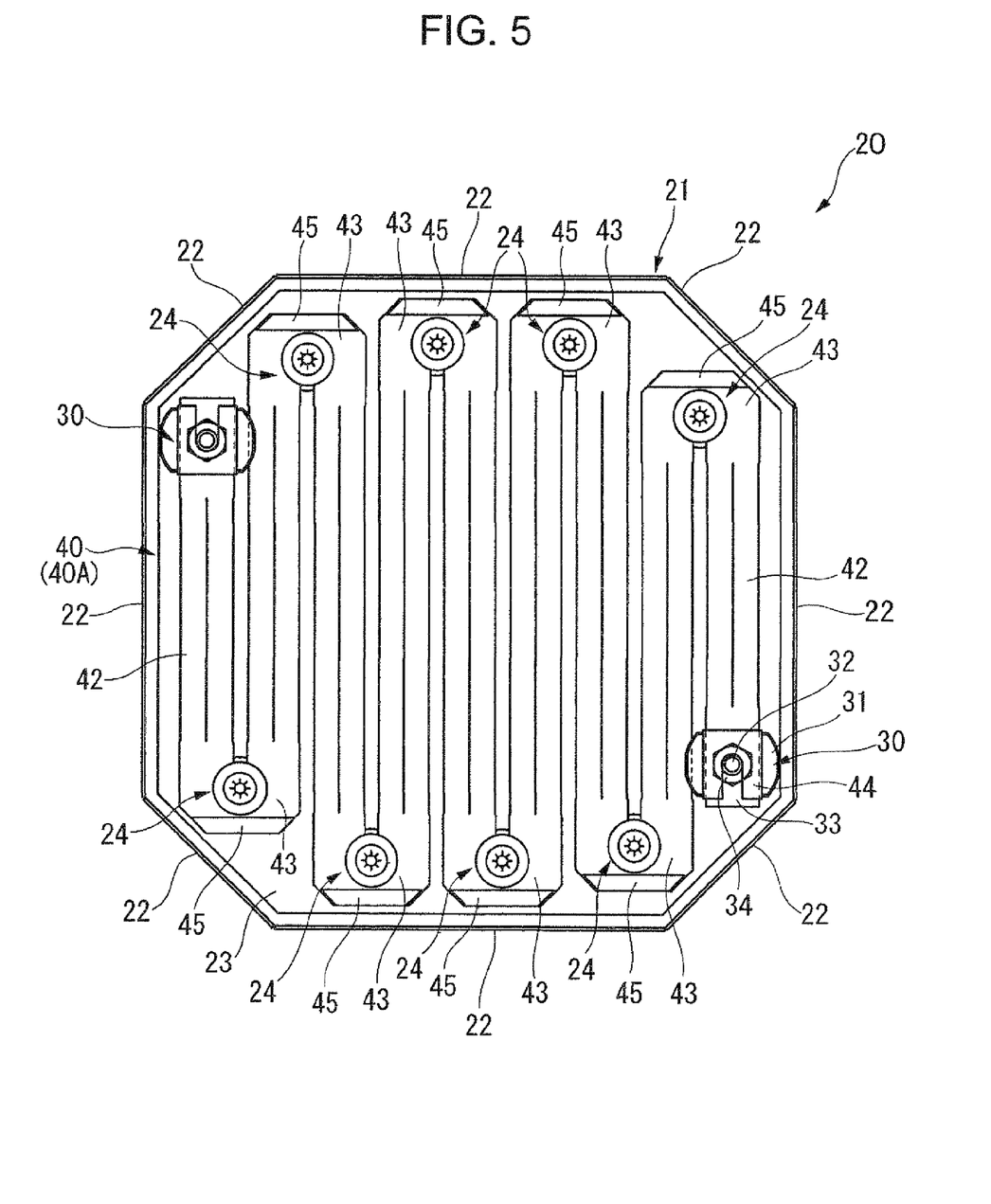
FIG. 5 is a front view of a radiant heater that is mounted on the heating unit shown in FIG. 1.
Figure 6:
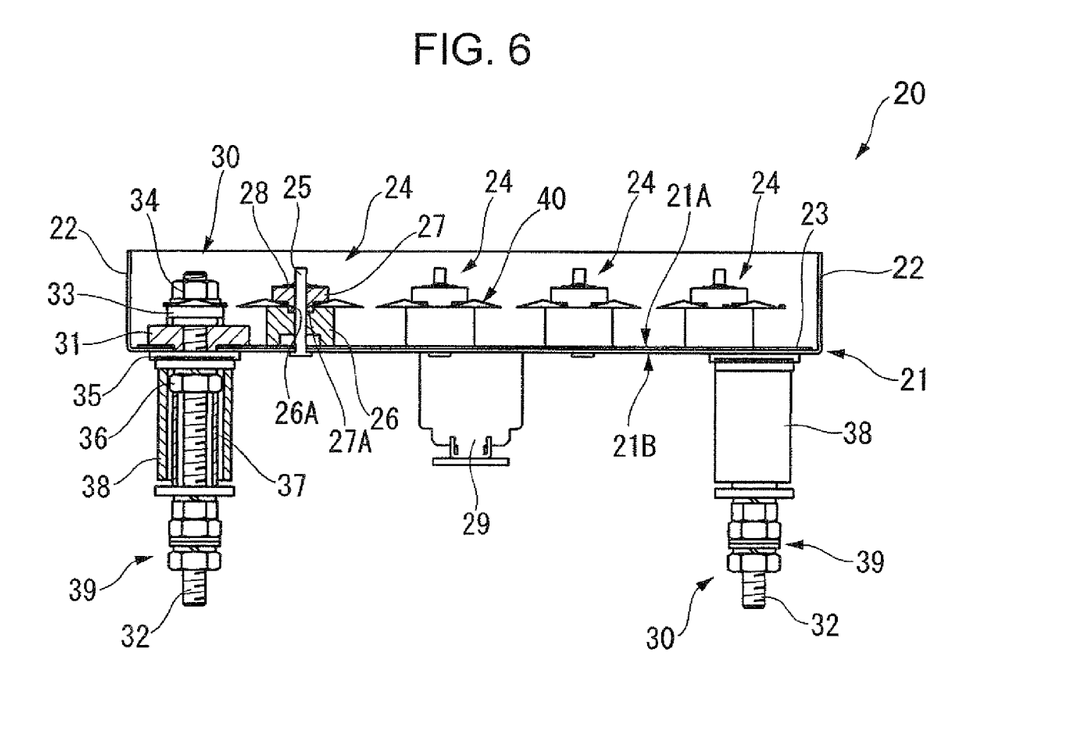
FIG. 6 is a cross-sectional view of the radiant heater shown in FIG. 5.
Figure 7:
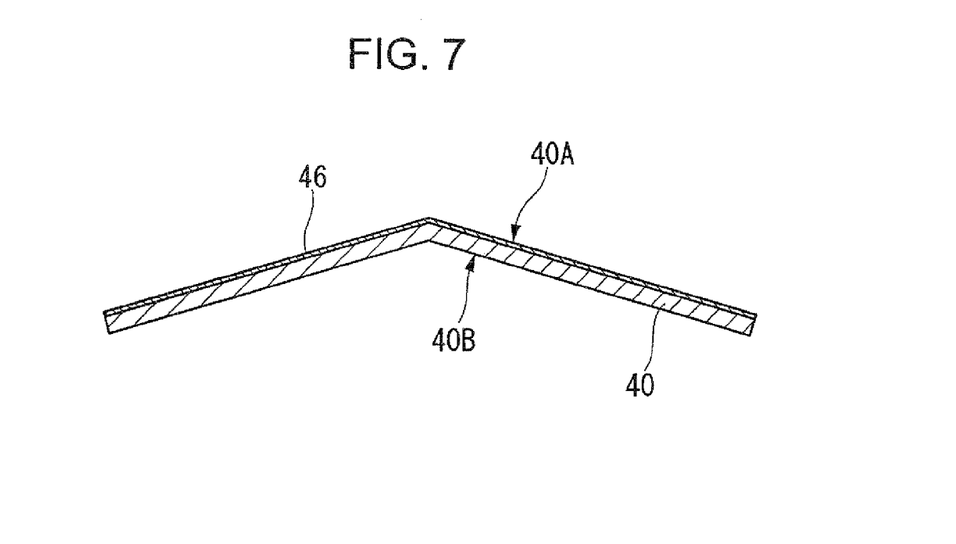
FIG. 7 is a partially enlarged cross-sectional view of a strip-shaped heater element included in the radiant heater shown in FIG. 5.

As shown in FIGS. 5 and 6, the radiant heater 20 includes a support plate 21 having a substantially square plate shape, and more specifically, having an octagonal plate shape that is conceptually made by cutting off four corners of a square plate along lines each of which intersects the sides of the square plate at 45°, and a strip-shaped heater element 40 disposed above a surface 21A (shown as an upper surface in FIG. 5) of the support plate 21 that is oriented in one direction.

The support plate 21 is made of, for example, a stainless steel plate, and at each side of the octagonal plate, a side wall portion 22 is provided which is made by bending in the direction in which the surface 21A is oriented so as to be perpendicular to the support plate 21, and thus the support plate 21, as a whole, has an octagonal tray shape. A slit is defined between the pair of side wall portions 22 that are provided at the sides of the octagonal plate.

A mica sheet 23 having superior heat insulation property and electrical insulation property is adhered to the surface 21A of the support plate 21 that is oriented in the one direction.

Furthermore bridging support members 24 and a pair of connection terminals 30 are provided on the surface 21A of the support plate 21 that is oriented in the one direction. In this embodiment, as shown in FIG. 5, the pair of connection terminals 30 is disposed on the diagonal of the octagonal plate (at upper-left and lower-right in FIG. 5), and eight bridging support members 24 are alternately disposed between the pair of connection terminals 30 and along a pair of opposed sides (the sides located at the upper and lower portions in FIG. 5) of the octagonal plate. The height of the bridging support members 24 and the pair of connection terminals 30 from the surface 21A of the support plate 21 that is oriented in the one direction is set lower by one step than that of the side wall portions 22.

As shown in FIG. 6, the bridging support member 24 includes a stud pin 25 that is fixed such that the stud pin 25 penetrates through a through hole formed in the support plate 21 and projects from the surface 21A oriented in the one direction, a pair of spacers (a first spacer 26 and a second spacer 27) having a substantially cylindrical shape through which the stud pin 25 penetrates, and a bush nut 28 for fixing the first and second spacers 26 and 27.

The first spacer 26 that is disposed on the surface 21A of the support plate 21 that is oriented in the one direction via the mica sheet 23 is made of an electrical insulator and a recess 26A is formed at the center of one surface of the first spacer 26.

The second spacer 27 is also made of an electrical insulator, and has a projected portion 27A that projects toward the other side (downward in FIG. 6) and that is engageable with the recess 26A. The projected height of the projected portion 27A is made greater than the depth of the recess 26A, and thus a small space is formed around a portion of the stud pin 25 located between the first and second spacers 26 and 27.

Each connection terminal 30 includes an insulation piece 31 that has a rectangular plate shape and is pressed into a through hole formed at a corner portion of the support plate from the surface 21A oriented in the one direction, and a bolt 32 that penetrates through the support plate 21 and the insulation piece 31 and projects from the surface 21A of the support plate 21 that is oriented in the one direction and from the surface 21B of the support plate 21 that is oriented in the other direction.

An electrode metal member 33 and a fixing nut 34 are provided at a portion of the bolt 32 that projects from the surface 21A of the support plate 21 that is oriented in the one direction. Moreover, at a portion of the bolt 32 that projects from the surface 21B of the support plate 21 that is oriented in the other direction, an insulation washer 35 is fixed by a nut 36 via a washer while contacting the surface 21B of the support plate 21, an internal tube 37 and an insulation tube 38 are disposed at the other side of the washer, and a connection portion 39 to which a power supply cable 57 is to be connected is constituted by nuts and washers at a position away from the internal tube 37 and insulation tube 38.

The strip-shaped heater element 40 is formed by cutting off a nichrome plate having a thin plate shape from the right and left alternately so as to form elongated nicks therein so that the strip-shaped heater element 40 configured to have a zig-zag shape in which strip-shaped portions 42 and turning portions 43 are alternately disposed.

Each end of the strip-shaped heater element 40 is cut off in U-shape, and a reinforcing member 44 having a similar U-shape is stacked and connected to the end.

Moreover, a recess (not shown) with which the projected portion 27A of the second spacer 27 constituting the bridging support member 24 is engageable is formed at an inside portion of the turning portion 43. Furthermore, a conductive member 45 having a small thin plate configuration is stacked and adhered to an outside portion of the turning portion 43.

Moreover, as shown in FIG. 7, the cross section of the strip-shaped heater element 40 is bent in a V-shape in such a manner that the center of the width thereof is projected in the one direction (shown as upward direction in FIG. 7). A coated film 46 is formed on the surface of the strip-shaped heater element 40 that is oriented in the one direction by painting a synthetic resin paint having a heat resistance and exhibiting black color to increase a radiation factor, and the coated film 46 is not formed on the surface of the strip-shaped heater element 40 that is oriented in the other direction. In other words, the coated film 46 is selectively formed only on the surface of the strip-shaped heater element 40 that is oriented in the one direction.

Here, the surface of the strip-shaped heater element 40 that is oriented in the one direction on which the coated film 46 is formed is used as a heating surface 40A that is disposed so as to face a heated object, and the surface that is oriented in the other direction on which the coated film 46 is not formed is used as an opposing surface 40B.

Moreover, the radiation factor of the heating surface 40A on which the coated film 46 is formed is set to be 0.96, and the radiation factor of the opposing surface 40B on which the coated film 46 is not formed is set in a range of 0.64 to 0.76.

The strip-shaped heater element 40 is mounted in such a manner that the opposing surface 40B faces the surface 21A of the support plate 21 that is oriented in the one direction, the ends of the strip-shaped heater element 40 are placed on the electrode metal member 33 provided on the connection terminal 30 and fixed by the fixing nut 34, and the recesses formed at the inside portions of the turning portions 43 of the strip-shaped heater element 40 are engaged with the projected portion 27A of the second spacer 27 of the bridging support member 24 so that the strip-shaped heater element 40 is movably supported in the space between the first spacer 26 and the second spacer 27 while being separated from the surface 21A of the support plate 21.

The fixing nuts 34 are welded to the bolts 32 to prevent loosening, and the tips of the stud pins 25 are deformed to prevent coming-off of the bush nuts 28.

Here, as viewed from a position facing the surface 21A of the support plate 21 that is oriented in the one direction, i.e., from a position facing the heating surface 40A of the strip-shaped heater element 40, the area of the strip-shaped heater element 40 occupies 55% to 75% of the area of the support plate 21, and more specifically, occupies 65% of the area of the support plate 21.

Moreover, an attachment portion 29 that has a rectangular cross-section and projects from the center of the octagonal face in parallel with the connection terminals 30 is provided on the surface 21B of the support plate 21 that is oriented in the other direction.

Figure 2:
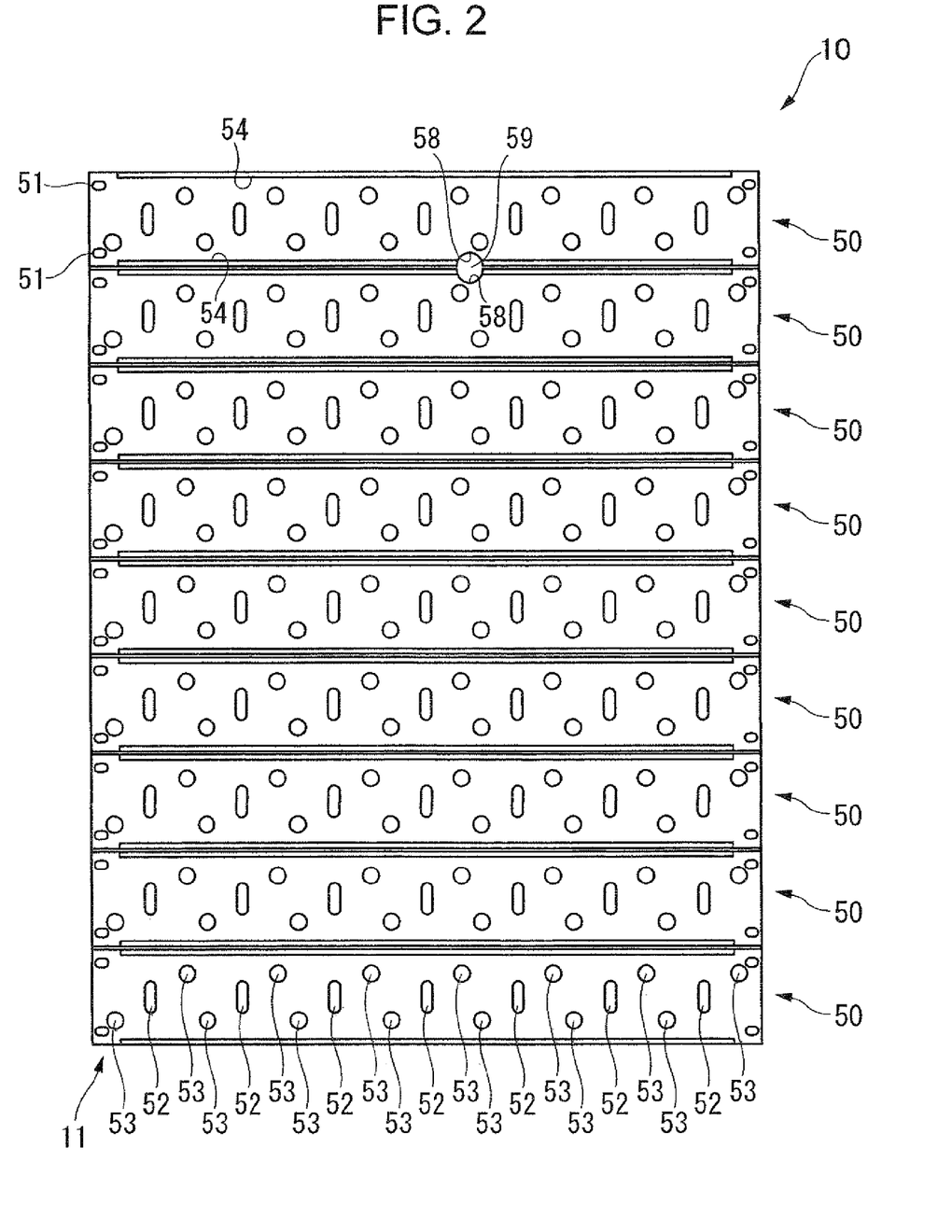
FIG. 2 is a back view of the heating unit shown in FIG. 1.
Figure 3:
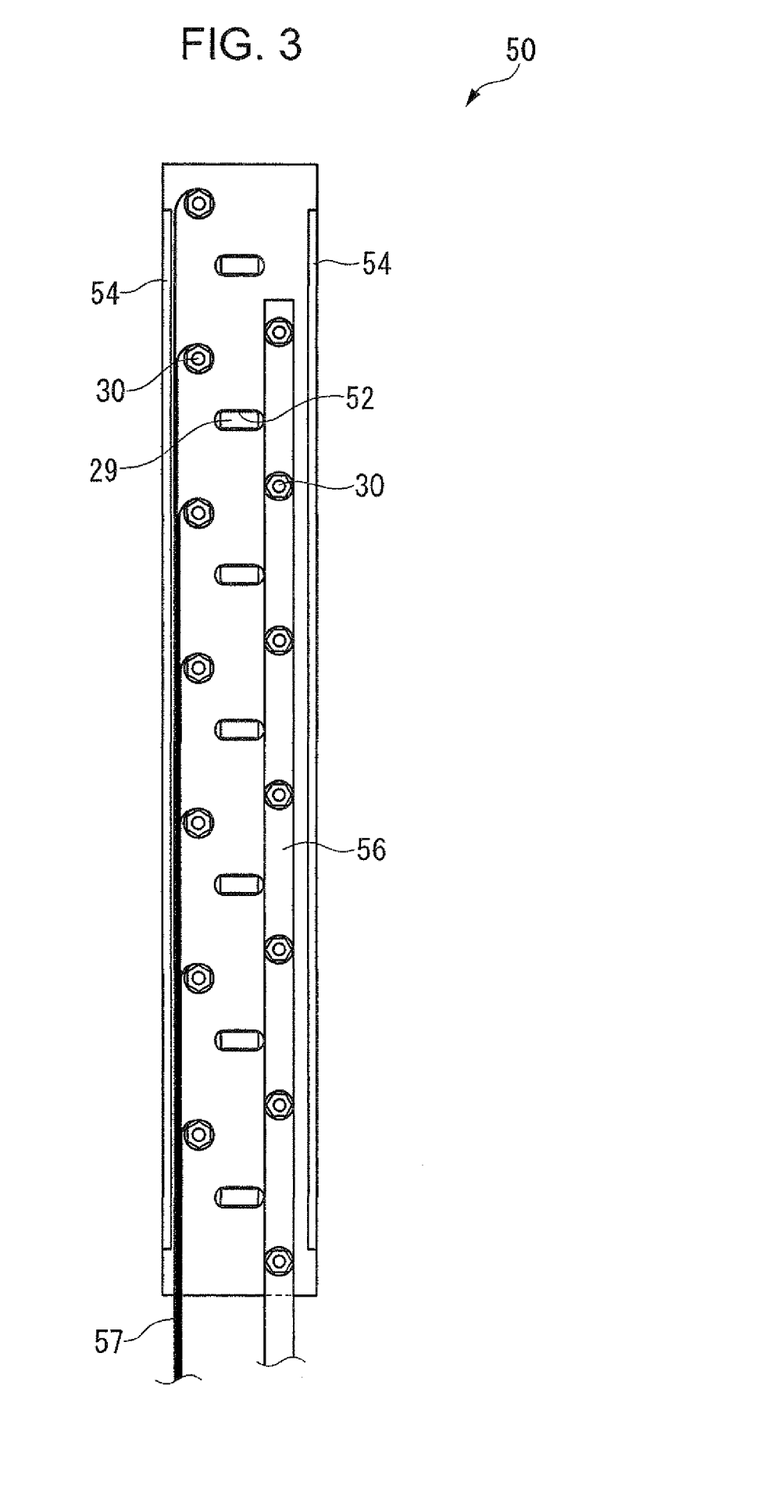
FIG. 3 is a drawing showing a bracket included in the heating unit shown in FIG. 1.

The bracket 50, on which the radiant heaters 20 configured as described above are arranged and mounted in a row, has a rectangular plate shape that extends in a direction along which the radiant heaters 20 arranged, as shown in FIGS. 2 and 3. Fixing holes 51 into which fixing screws (not shown) for fixing the brackets 50 to the frame 11 are to be inserted are formed at both ends, in the longitudinal direction, of the bracket 50. The fixing holes 51 are oblong holes whose longer diameter extends in a direction along which the radiant heaters 20 are arranged in a row.

In addition, at the center in the width direction of the bracket 50, attachment holes 52 having an oval shape elongating in the width direction and into which the attachment portions 29 of the radiant heaters 20 are inserted are arranged in a row, and in particular in this embodiment, seven attachment holes 52 are provided. In other words, the bracket 50 is configured so as to allow seven radiant heaters 20 to be mounted thereon in a row.

At both sides of the attachment holes 52 in the width direction, terminal holes 53 into which the connection portions 39 of the pairs of connection terminals 30 are inserted are arranged in rows. In other words, the terminal holes 53, the attachment holes 52, and the terminal holes 53 are arranged in three rows.

Figure 4:
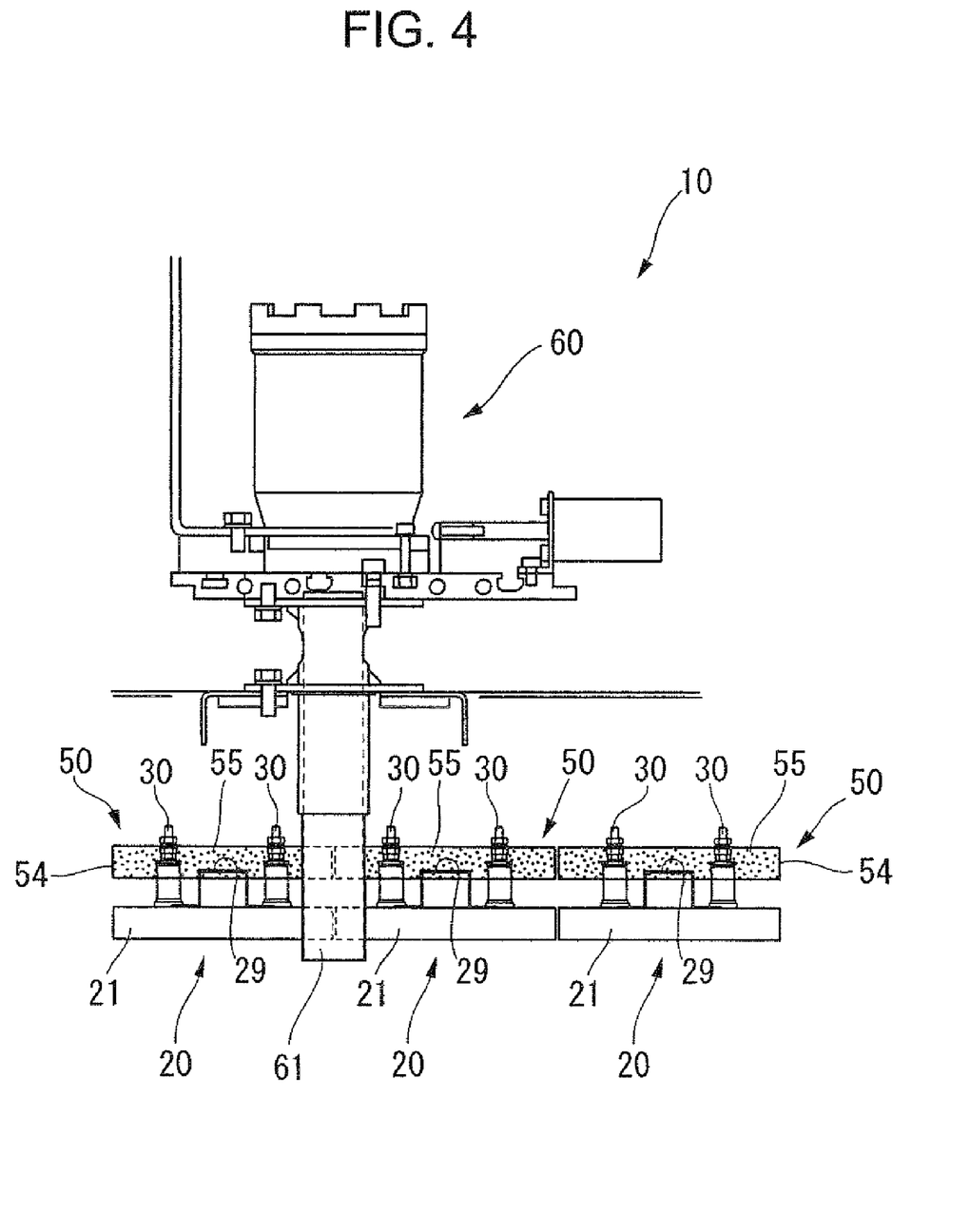
FIG. 4 is a partial cross-sectional view of the heating unit shown in FIG. 1.

Moreover, as shown in FIG. 4, each bracket 50 is bent in an L-shape at the both ends thereof in the width direction toward the attachment portions 29 of the radiant heaters 20 so as to form holding portions 54 for holding a heat insulator 55 such as made of ceramics fibers or the like.

The attachment portion 29 of the radiant heater 20 is inserted into the attachment holes 52, the connection portions 39 of the pair of connection terminals 30 are respectively disposed in the terminal holes 53, and the attachment portion 29 and the connection portions 39 are fixed by clamping members (not shown), thereby, as shown in FIG. 4, the radiant heater 20 is fixed in a state in which the support plate 21 is separated from the bracket 50.

It should be noted that the height of the attachment portion 29 is set so that the connection portions 39 of the connection terminals 30 that are inserted into the terminal holes 53 project from the heat insulator 55.

Here, ones of the connection terminals 30 (the right ones in FIG. 3) of the seven radiant heaters 20 are connected to each other by a bus bar 56 made of copper, and power supply cables 57 are respectively connected to the others of the connection terminals 30 (the left ones in FIG. 3). It should be noted that, in this embodiment, a 3-phase and 4-line configuration is employed, the bus bar 56 is used as a neutral line (N), and one of the U-phase, V-phase, and W-phase is connected to each of the others of the connection terminals 30.

Figure 1:
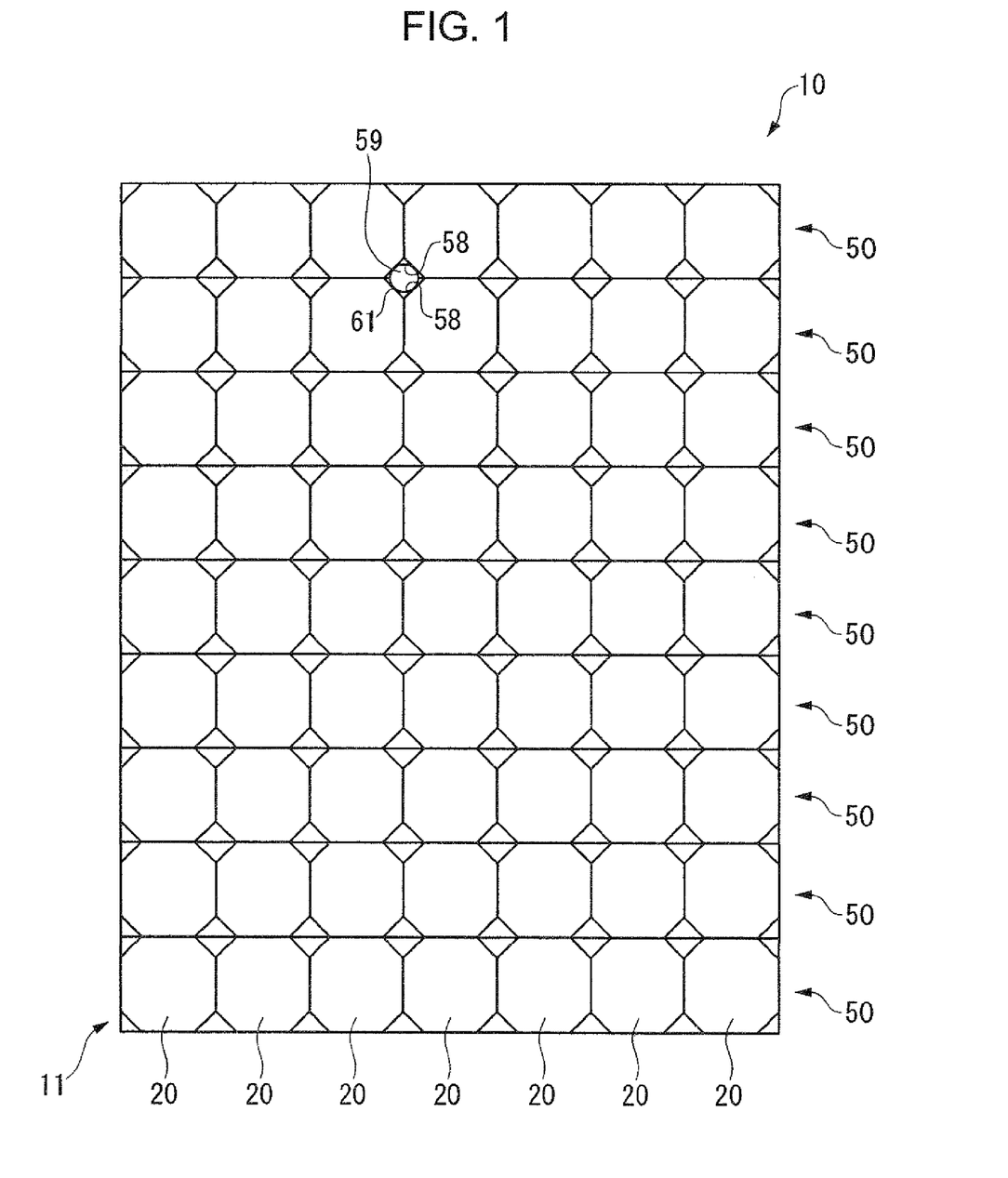
FIG. 1 is a front view of a heating unit as an embodiment.

The brackets 50, on each of which the seven radiant heaters 20 are mounted in a row, are fixed to the frame 11 while being arranged side by side in the width direction, and thus the heating unit 10 is constituted. In this embodiment, nine brackets 50 are fixed to the frame 11, and as shown in FIG. 1, 63 (=7×9) radiant heaters 20 are arranged.

Here, as shown in FIG. 2, recesses 58 having a half circle shape and opening toward the adjacent bracket 50 are formed in some of the nine brackets 50. It should be noted that the recesses 58 are provided in a space defined by cut-off corners of the radiant heaters 20 that are arranged in rows, and thus interference with the support plate 21 and the side wall portions 22 is prevented.

These recesses 58 are arranged so as to face each other, and thus an insertion hole 59 having a circular cross-section is defined into which a protective pipe 61 that allows infrared rays of a radiation thermometer 60 to pass through is inserted.

Figure 8:
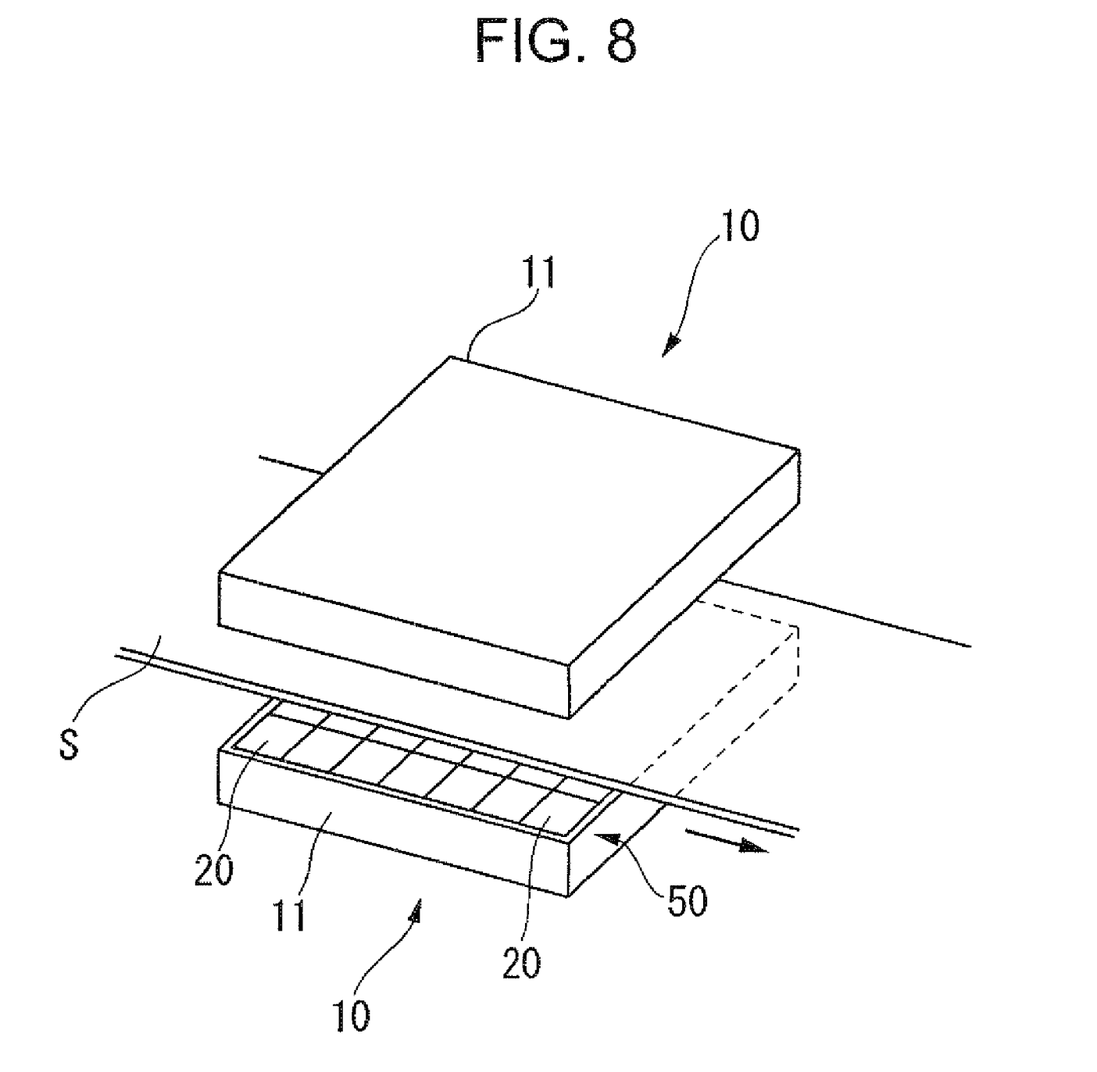
FIG. 8 is a perspective view of a resin sheet heating apparatus in which the heating unit shown in FIG. 1 is employed.

A resin sheet heating apparatus is constituted by arranging two heating units 10 configured as described above in such a manner that the heating surfaces 40A of the radiant heaters 20 face each other as shown in FIG. 8.

The strip-shaped heater element 40 of each of the radiant heaters 20 that are arranged in plurality is heated by being supplied with electrical power, and the resin sheet heating apparatus heats a resin sheet S as a heated object using radiant heat from the strip-shaped heater element 40. Here, the resin sheet S can be heated in desired patterns by adjusting electrical current or voltage being supplied to the radiant heaters 20.

Because seven radiant heaters 20 are mounted on the bracket 50 in a row in the heating unit 10 in this embodiment and the brackets 50 are mounted on the frame 11 in a parallel arrangement in the width direction, the heating unit 10 can be constituted by mounting the radiant heaters 20 on the respective brackets 50, and thereafter by mounting the brackets 50 on the frame 11, and thus it is easy to carry out the mounting work for the radiant heaters 20.

Furthermore, by adjusting the distance between the radiant heaters 20 in the row when the radiant heaters 20 are mounted on the bracket 50, and by adjusting the distance between the brackets 50 when the brackets 50 are mounted on the frame 11 in a parallel arrangement, interference between the radiant heaters 20 can be prevented when the radiant heaters 20 thermally deform, the heated object (the resin sheet S) can be stably heated.

Because the recesses 58 having a half circle shape and opening toward the adjacent bracket 50 that is fixed to the frame 11 are formed in some of the nine brackets 50, the recesses 58 are arranged so as to face each other, and thus the insertion hole 59 having a circular cross-section is defined into which the protective pipe 61 that allows infrared rays of the radiation thermometer 60 to pass through is inserted, the temperature of the heated object (the resin sheet S) can be measured by the radiation thermometer 60, and the heated object (the resin sheet S) can be heated in a precisely controlled manner by feeding back the measured results and by adjusting electrical current or voltage supplied to the strip-shaped heater element 40.

Moreover, because the fixing holes 51 into which fixing screws (not shown) for fixing the brackets 50 to the frame 11 are to be inserted are formed at both ends, in the longitudinal direction, of the bracket 50, and the fixing holes 51 are oblong holes whose longer diameter extends in a direction along which the radiant heaters 20 are arranged in a row, the brackets 50 are reliably fixed to the frame 11 even when the brackets 50 thermally deform, and thus the heated object (the resin sheet S) can be stably heated.

Furthermore, by connecting each other ones of the connection terminals 30 that project from the terminal holes 53 and are arranged in a direction along which the radiant heaters 20 are arranged by the bus bar 56, the number of power supply cables 57 to be connected to the connection terminals 30 cab be reduced, and the wiring work can be further facilitated.

Moreover, because the number of power supply cables 57 is reduced, interference between the power supply cables can be prevented even if the projected heights of the ones of the connection terminals 30 and the others of the connection terminals 30 are set to be the same. Accordingly, by uniformly setting the projected heights of the connection terminals 30, the thickness of the brackets 50 can be reduced, and the size of the heating unit 10 can be minimized.

Furthermore, in the radiant heater 20, because the coated film 46 that increases a radiation factor is formed on the heating surface 40A of the strip-shaped heater element 40 that faces the heated object (the resin sheet S), the heated object (the resin sheet S) can be efficiently heated. Moreover, because the coated film 46 is not formed on the opposing surface 40B of the strip-shaped heater element 40 that faces the surface 21A of the support plate 21, radiation of heat from the opposing surface 40B is restrained, temperature rise in the support plate 21 is restrained, thermal effects to the support plate 21 and the connection terminals 30 can be restrained.

Furthermore, because radiant heat from the opposing surface 40B is restrained, it is not necessary to provide a reflection plate having a high reflectance on the support plate 21 to reflect heat, and the state of heating by the radiant heater 20 does not vary depending on the surface condition of the reflection plate. More specifically, in this radiant heater 20, the reflected heat hardly contributes to heating, and only radiant heat from the heating surface 40A of the strip-shaped heater element 40 contributes to heating of the heated object (the resin sheet S). Therefore, variation of the state of heating in the radiant heaters 20 is small even if the radiant heaters 10 are used while being arranged side by side, and thus the heated object (the resin sheet S) can be evenly heated.

Moreover, because the area of the heating surface 40A of the strip-shaped heater element 40 occupies 55% to 75% of the area of the support plate 21, and more specifically, occupies 65% of the area of the support plate 21 when viewed from a position facing the heating surface 40A, the heated object (the resin sheet S) can be evenly heated only by radiant heat from the strip-shaped heater element 40, space between the strip-shaped portions 42 that are disposed side by side can be ensured, and thus, even when the strip-shaped heater element 40 deforms due to thermal expansion thereof, mutual contact in the strip-shaped heater element 40 can be prevented, and the heated object (the resin sheet S) can be efficiently heated by increasing the temperature of the strip-shaped heater element 40, i.e., by increasing the radiant heat.

Moreover, because the cross section of the strip-shaped heater element 40 is bent in a V-shape in such a manner that the center of the width thereof is projected in the one direction, the rigidity of the strip-shaped heater element 40 is ensured, and deformation of the strip-shaped heater element 40 during heating in such a manner that a portion thereof is sagged can be prevented.

Moreover, because the conductive member 45 is adhered to an outside portion of the turning portion 43 of the strip-shaped heater element 40, an electrical current path at the turning portion 43 is corrected, and an even current can be achieved.

While a heating unit as an embodiment of the present invention has been described above, it should be understood that the present invention is not to be considered as limiting, and various modifications can be made without departing from the technical spirit of the invention.

For example, the description was made assuming that 63 (=7×9) radiant heaters are arranged; however, the configuration is not limited to this, and arrangement of the radiant heaters may be preferably determined by taking into account the size, material, or the like of a heated object.

Furthermore, the description was made assuming that nine brackets are arranged and fixed in a row; however, the configuration is not limited to this, and the brackets may be arranged in a plurality of rows, for example, fourteen brackets may be arranged in two rows each having seven brackets.

Moreover, the description was made assuming that the fixing holes for the brackets are oblong holes whose longer diameter extends in a direction along which the radiant heaters are arranged in a row, and the brackets are fixed to the frame by inserting the fixing screws into the fixing holes; however, the configuration is not limited to this, and other fixing means may be employed. It should be noted, however, that it is preferable that the fixing holes be oblong holes whose longer diameter extends in a direction of row arrangement as in the present embodiment because fixing of the brackets can be ensured even when the brackets thermally deform.

Furthermore, the description was made assuming that the recesses having a half circle shape and the recesses are arranged so as to face each other, and thus the insertion hole having a circular cross-section is defined; however, the shape of the recess is not limited, and the insertion hole may have a rectangular cross-section shape or an oval cross-section.

Moreover, the description was made assuming that the radiation thermometer is provided as a sensor for detecting the state of heating of the heated object; however, the configuration is not limited to this, and other type of sensor may be employed.

The description was made assuming that the strip-shaped heater element is configured in a zigzag shape; however, the configuration is not limited to this, and the strip-shaped heater element may be configured in a spiral shape. It should be noted, however, that a zigzag-shaped configuration of the strip-shaped heater element as in the present embodiment is preferred because the connection terminals can be sufficiently separated from each other, which lead to an easy connecting operation.

Moreover, the description was made assuming that the area of the heating surface of the strip-shaped heater element occupies 55% to 75% of the area of the support plate; and more specifically, occupies 65% of the area of the support plate when viewed from a position facing the heating surface; however, the numerical range is not limited to this.

What is claimed is:

1. A heating unit comprising:
   a plurality of radiant heaters;

a plurality of brackets on which the radiant heaters are mounted in a row;

a frame on which the brackets are mounted in a parallel arrangement and thereby the radiant heaters are mounted in a grid configuration; and a protective pipe that accommodates a sensor detecting a state of heating of a heated object, wherein each of the radiant heaters includes: a support plate substantially having a rectangular shape; a pair of connection terminals substantially perpendicularly extending, while having a space therebetween, from one surface of the support plate; and a strip-shaped heater element arranged between the pair of connection terminals and covering the one surface of the support plate, wherein the connection terminals have connection portions projecting from the other surface of the support plated, and each of the brackets has a terminal hole into which the connection portion is inserted, and wherein recesses are formed at least at portions of the brackets adjacent to each other, the recesses opening toward each other, and the protective pipe is disposed in an insertion hole that is defined by disposing the recesses so as to oppose each other.

2. The heating unit according to claim 1, wherein the bracket includes a fixing hole for fixing the bracket to the frame, and the fixing hole is an oblong hole whose longer diameter extends in a direction along which the radiant heaters are arranged in a row.

3. The heating unit according to claim 1, wherein ones of the pair of connection terminals of the radian heaters are arranged in a row and connected to each other by a bus bar.

4. A resin sheet heating apparatus comprising at least two of the heating units according to claim 1, wherein the heating units are arranged so that radiant heaters thereof face each other, and the resin sheet heating apparatus is configured in such a manner that a resin sheet that is a heated object is disposed between the heating units.

* * * * *